Dec. 8, 1925.

W. L. HOLLOWAY
SHACKLE FOR SPRINGS
Filed Aug. 11, 1924

INVENTOR
Willis L. Holloway
BY
Richey, Slough & Watts
ATTORNEYS.

Dec. 8, 1925.

W. L. HOLLOWAY

SHACKLE FOR SPRINGS

Filed Aug. 11, 1924

INVENTOR
Willis L. Holloway
BY
Richey, Slough & Watts
ATTORNEYS

Patented Dec. 8, 1925.

1,564,416

UNITED STATES PATENT OFFICE.

WILLIS L. HOLLOWAY, OF CLEVELAND, OHIO, ASSIGNOR, BY MESNE ASSIGNMENTS, TO THE UNION TRUST COMPANY, TRUSTEE, OF CLEVELAND, OHIO.

SHACKLE FOR SPRINGS.

Application filed August 11, 1924. Serial No. 731,377.

*To all whom it may concern:*

Be it known that I, WILLIS L. HOLLOWAY, a citizen of the United States, residing at Cleveland, in the county of Cuyahoga and State of Ohio, have invented certain new and useful Improvements in Shackles for Springs, of which the following is a specification.

My invention relates to a new and improved shackle for springs, more particularly it relates to a load carrying shackle for automobile springs which is provided with yieldable shock absorbing means.

It also relates to a combined load carrying and shock absorbing shackle for automobile springs which is adapted to resist shock and rebound, is easy to assemble and disassemble and which may be repeatedly installed on or removed from an automobile quickly and easily.

It further relates to a shackle for springs, having positive means comprising a rigid link for connecting a spring to its support and also having yieldable means for resisting all relative movement of the said spring and support.

It further relates to a shackle composed of non-yieldable parts movably connected, certain of which parts serve to carry all the load and yieldable means connected to the non-yieldable parts for resisting relative movement of these said parts.

In the drawings accompanying and forming a part of this specification,

Figure 6:
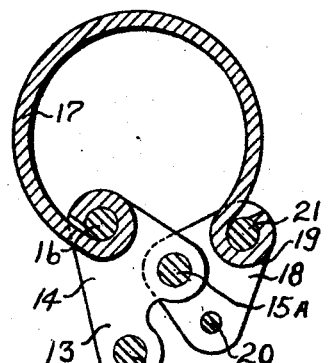
Fig. 6 is a cross sectional view taken on line 6—6 of Fig. 5.
Figure 5:
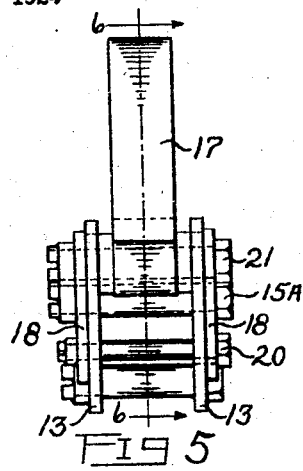
Fig. 5 is a view similar to Fig. 3 of a modified form of device embodying my invention.
Figure 8:
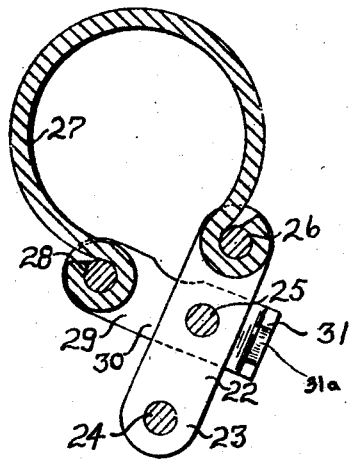
Figure 7:
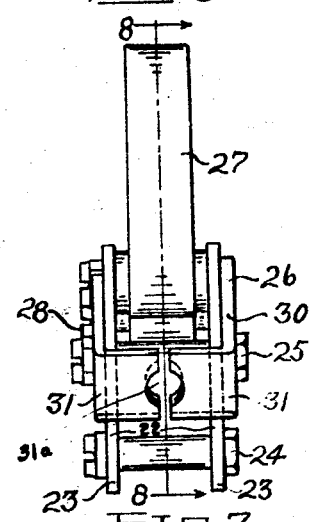
Figure 10:
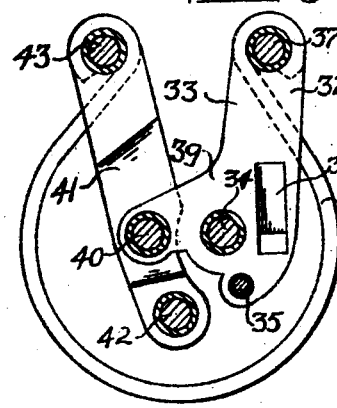
Figure 9:
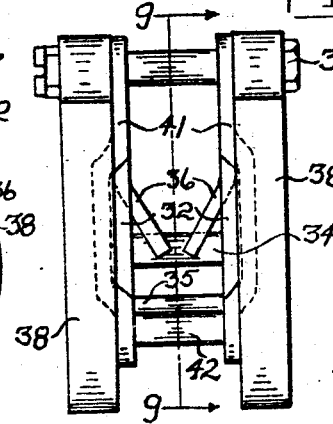

Figs. 7 and 8 are respectively side elevational and cross sectional views similar to Figs. 5 and 6 but showing another modified form of device embodying my invention, and Figs. 9 and 10 are views similar to Figs. 5 and 6 but showing a still further modified form of device embodying my invention.

Referring first to Figs. 1 to 4 inclusive, 1 designates the axle of an automobile having the ordinary wheel 2 mounted at one end thereof and carrying a bracket, post or other spring support 3 to which the automobile spring 4 is to be movably connected.

Non-yieldable link 5 comprising rigid plates 6 which carry bolts 7 and 7ª at the ends thereof serves to connect the spring 4 to its support 3. The link 5 is substantially rigid but the bolts 7 and 7ª are movably mounted in the support and spring, so that the spring may flex and move relative to the support in the ordinary manner.

An anchor 8 comprising spaced rigid plates 9 is fixedly secured to the support 3 by bent portions 10 of the plates 9 which underlie and bear against the support 3 and by a pin or bolt 11 extending above and in close contact with the top of the support 3. The bolt 7ª of link 5 which passes through the support 3 also passes through the inner ends of the plates 9 of the anchor 8. In this manner the rigid link 5 is movably connected to the rigid anchor 8 by bolt 7ª and the anchor 8 is secured to the spring support 3 in a manner to prevent movement of the anchor relative to the support 3. I mount two springs 12 on the extension of the bolts 7 and 11 outside of the rigid links 5 and the anchor 8. These springs are curved on a substantially true circle, except closely adjacent to the ends thereof where loops are formed to encircle the bolts 7 and 11. The springs are of such length and such a curvature that they are normally unflexed and substantially free from any load or distortions when the device is installed as indicated on Fig. 1. In this condition the springs 12 are adapted to resist any movement of the spring 4 relative to its support 3 whether such movement be due to a movement of the body toward or away from the chassis of the automobile; thus the springs 12 tend to absorb, resist or snub not only rebound, but also shock. My device thus tends to maintain the normal position of rest of the automobile springs with respect to its support and to restore it to such position with a minimum number of vibrations when that normal position is disturbed by movement of the spring shackle in any direction by any motion given to the car spring whether communicated thru the car body or wheels.

Figure 1:
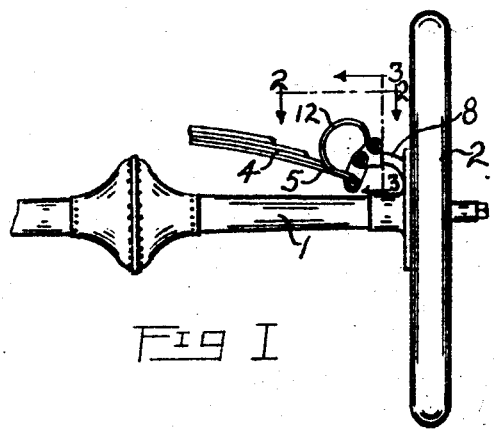
Fig. 1 is a fragmentary view of an automobile equipped with a device embodying my invention.
Figures 2, 3:
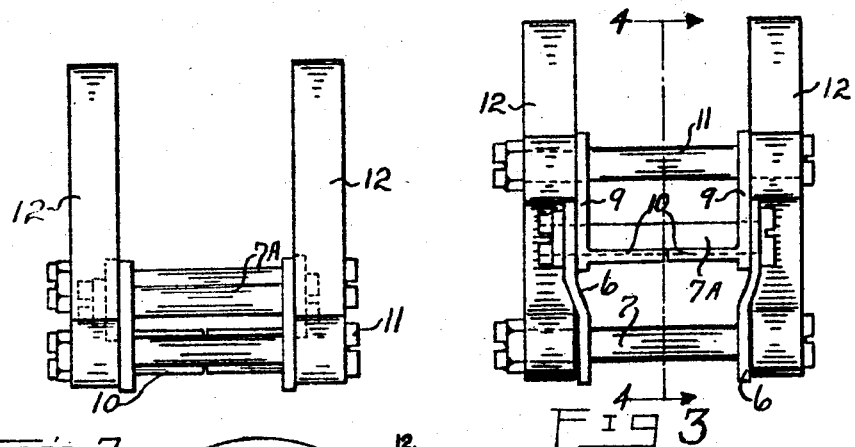
Fig. 2 is a top plan view of my improved device taken on lines 2—2 of Fig. 1.
Fig. 3 is a side elevation on lines 3—3 of Fig. 1.
Figure 4:
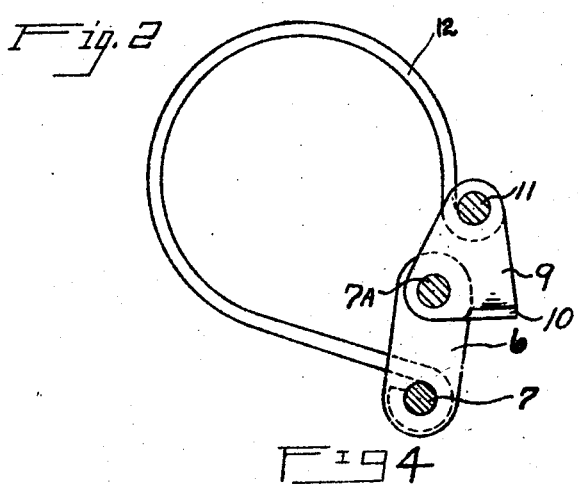
Fig. 4 is a sectional view of my improved device shown in the foregoing figures, taken on line 4—4 of Fig. 3.

My improved device may be constructed cheaply due to the simplicity and small number of parts and it may be quickly and most easily installed on an automobile or repeatedly removed and reinstalled. In applying it to an automobile such as is indicated in Fig. 1 it is only necessary to block the spring 4 in its normal position as by inserting a block of wood between the spring and axle, and then remove the ordinary shackle and shackle bolts. Then bolts 7a and 11 are removed and plates 9 are spread apart so as to fit into position on opposite sides of the support 3, the bolts 7a being reinserted through the eye of the support and the bolt 11 being inserted and passing over and resting on support 3. Then bolt 7 may be removed and after the plates 6 are placed in position on opposite sides of the spring 4 the bolt is inserted through the eye of the spring. It is thus unnecessary to completely disassemble my device when installing or removing the same, all parts being kept intact. The block under the spring 4 may then be removed and the installation is complete. When it is desired to remove my improved load carrying, shock absorbing device the preceding operation may be reversed, as will be readily understood.

It will be observed that the springs 12 are normally in an unflexed condition and accordingly the installation or removal of the device from an automobile may be carried out without working against the force of any flexed yieldable means.

The substantially circular curvature of the springs and their relatively long length tends to distribute strains and shocks more evenly and uniformly throughout the spring thus prolonging the life of the spring and at the same time conferring most desirable riding qualities on the device.

It will be noted that the spring 4 is connected to its support by a load carrying connection, which is rigid positive and which will function in substantially the same manner as the ordinary shackle in case either or both of the springs 12 should break while in service. It will also be noted that the springs 12 are auxiliary to the load carrying connection and do not carry any of the load except under shock of rebound. They absorb or resist all relative movement in a vertical plane between the body carried by the spring and the spring support and they tend to restore the springs and their supports to their relative normal positions without permitting any violent shock and rebound or repeated vibrations.

In Figs. 5 and 6 I have shown a slightly modified form of device which operates and is constructed on the same general principles as the modification shown in Figs. 1 to 4 inclusive, but which differs in certain structural details.

In these figures, 13 indicates a shackle comprising two rigid sides 14 carrying bolts 15 and 15a to engage respectively with the eye of a spring 4 and the eye of a spring support 3. Sides 14 are extended upwardly and provided near the upper end thereof with a bolt 16 to carry one end of a curved spring 17. 18 designates an anchor comprising sides 19 through which bolt 15a passes. These sides carry a through bolt 20 having a bearing against the underside of support 3 and bolt 21 located above and bearing on the top side of support 3, this bolt also serving as a securing means for one end of spring 17.

The spring 17 is curved on a substantially true circle and possesses the advantages enumerated hereinabove in connection with springs 12, but as will be noted, is somewhat wider than the springs 12 and is sufficiently strong to replace the two springs 12.

The method of installing and removing this form of device is substantially the same as has been described in connection with the modification of Figs. 1 to 4.

In Figs. 7 and 8 wherein I have shown a further modified form of the device embodying my invention the link connecting the spring to its support is designated by character 22 and consists of rigid sides 23 carrying a bolt 24 at one end for the spring 4, a bolt 25 near its middle for support 3 and a bolt 26 in an extension thereof for one end of the spring 27. The other end of spring 27 is secured to a bolt 28 which is carried in one end of the sides 29 of an anchor 30. The sides 29 of anchor 30 are perforated in their middle to receive the bolt 25 and are extended therebeyond and suitably cut away as at 31a so that they may be turned toward one another and engage with the upper and lower sides of the support 3 thereby fixedly securing the anchor 30 with respect to the support 3. Spring 27 resembles the springs 12 and 17 except that it is more nearly circular due to the similarity of curvature at the ends for encircling bolts 26 and 28. The device shown in Figs. 7 and 8 may be installed in substantially the same manner as the foregoing modifications and possesses substantially the same advantages, operates similarly and embodies the same principles.

Figs. 9 and 10 illustrate a still different modification which, however, embodies certain of the principles of the foregoing modifications and operates in somewhat the same manner. This modification comprises an anchor 32 consisting of sides 33 which carry a bolt 34 to pass through the eye of support 3.

A bolt or pin 35 at the lower end of sides 33 and struck out portions 36 engage respectively with the lower and upper sides of a support 3 and securely fix the anchor with respect to the support.

The sides 33 also carry in an upward extension thereof a bolt 37 to which is secured the ends of two curved springs 38. In a forward extension 39 of the sides 33 a bolt 40 is located which pivotally carries rigid side pieces 41. In the lower ends of these side pieces 41 is located a bolt 42 which is to pass through the eye of a spring 4. In the upper end of these side pieces a bolt 43 passes through and secures the other ends of the springs 38.

The springs 38 are somewhat longer than the springs of the foregoing modifications, but are mounted in a normally unflexed condition and are adapted to resist movement of the spring 4 and support 3 toward or away from each other under shock as well as rebound. Inasmuch as the spring is normally unflexed the device of Figs. 9 and 10 may be installed on or removed from an automobile with substantially the same facility as the foregoing modifications.

In case suitably drilled bolts are employed provided with well-known grease or oil cups or nipples, my improved device may be lubricated in any standard well known manner.

Although I have in all of the foregoing modifications shown only curved springs to serve as shock-absorbing means in connection with my improved combined load carrying shackle it will be understood by those skilled in the art that I may substitute for the curved springs, springs of other configurations or may replace the springs by any suitable yieldable means capable of absorbing or resisting shock. Accordingly I do not limit my invention to the use of the particular details shown and described, but define the scope of my invention by what is claimed.

What I claim is:

1. A unitary device to be substituted as a unit for an automobile spring securing shackle, comprising separate members operatively assembled together, and including pivotally connected rigid members for carrying a load, and resilient means carried by the said rigid members to restrain pivotal movement of the said members relative to each other.

2. A unitary shackle for a spring, comprising separate parts operatively assembled together, the said shackle comprising an anchor to be fixed to a spring support, a rigid link pivoted to the anchor, and resilient means connected to the anchor and link to resist pivotal movement of the link with respect to the anchor.

3. A unitary shackle for a spring, comprising separate parts operatively assembled together, the said shackle comprising an anchor to be fixed to a spring support, a rigid link pivoted to the anchor, and a spring connected to the anchor and link to resist pivotal movement of the link with respect to the anchor.

4. A shackle for springs, comprising rigid pivotally connected load carrying members, and shock absorbing means connected at opposite ends to the said members, the said members and means being assembled together and constituting an independent unitary device capable of being substituted as such for the ordinary spring carrying shackle of an automobile.

5. A shackle for automobile springs comprising a link for joining a spring to its support, the link having an extension and being movable relative to the support, an anchor fixed with respect to the said support, and a spring connected to the said extension and to the said anchor to resist resiliently relative movement of the link with respect to the said support.

6. A shackle for automobile springs comprising an anchor, a link pivoted thereto and spring means carried solely by the said anchor and said link to resist pivotal movement of the link with respect to the anchor.

7. A shackle for automobile springs comprising a link having an extension, an anchor pivotally connected to the link and a normally unflexed spring carried by the said extension and by the said anchor in position to be flexed by any pivotal movement between the link and said member.

8. A shackle for connecting a spring to a support comprising a load carrying link, an anchor fixedly secured with respect to the support and pivotally connected to the link and normally undistorted yieldable means carried by the link and anchor and capable of yielding when the link and anchor move relative to each other.

9. The spring shackle as described in claim 6, wherein said spring means comprises a looped leaf spring secured at its ends to the anchor and link respectively.

10. The spring shackle as described in claim 6, wherein the said spring means is substantially normally untensioned and adapted to be tensioned under relative movement of the link and anchor.

11. The spring shackle as described in claim 6, wherein the spring means is in nearly the form of a circle.

12. The spring shackle as described in claim 6, characterized by the provision of openings through the terminals of the spring means, the link comprising side plates, and a bolt passed through the side plates and one of the spring terminal openings, the spring being interposed between the side plates at its terminal having such opening.

In testimony whereof I hereunto affix my signature this 5th day of August, 1924.

WILLIS L. HOLLOWAY.